United States Patent
Zhou et al.

(10) Patent No.: US 9,977,787 B2
(45) Date of Patent: May 22, 2018

(54) MACHINE MAINTENANCE OPTIMIZATION WITH DYNAMIC MAINTENANCE INTERVALS

(71) Applicant: SAP SE, Walldorf (DE)

(72) Inventors: Wenjun Zhou, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 15/013,188

(22) Filed: Feb. 2, 2016

(65) Prior Publication Data

US 2017/0220594 A1    Aug. 3, 2017

(51) Int. Cl.
| | | |
|---|---|---|
| *G06F 17/30* | (2006.01) | |
| *G06F 7/00* | (2006.01) | |
| *G06F 12/0813* | (2016.01) | |
| *G06F 12/0804* | (2016.01) | |

(52) U.S. Cl.
CPC .. *G06F 17/30174* (2013.01); *G06F 17/30082* (2013.01); *G06F 12/0804* (2013.01); *G06F 12/0813* (2013.01); *G06F 17/30132* (2013.01)

(58) Field of Classification Search
CPC ............. G06F 12/0804; G06F 12/0806; G06F 12/0813; G06F 12/0877; G06F 17/30132; G06F 3/0613; G06F 3/0643; G06F 3/067; G06F 9/5016

USPC .......................................................... 707/618
See application file for complete search history.

(56) References Cited

U.S. PATENT DOCUMENTS

| | | | |
|---|---|---|---|
| 7,006,903 B2 * | 2/2006 | Smith .................. | G08G 5/0043 244/1 R |
| 7,457,762 B2 * | 11/2008 | Wetzer .................. | G06Q 10/06 705/7.25 |
| 2008/0234979 A1* | 9/2008 | Costiner ................ | G06Q 10/04 702/184 |
| 2010/0070237 A1* | 3/2010 | Yitbarek ................ | G06Q 10/06 702/177 |
| 2017/0083822 A1* | 3/2017 | Adendorff .............. | G06N 7/005 |

\* cited by examiner

*Primary Examiner* — Kuen S Lu
(74) *Attorney, Agent, or Firm* — Brake Hughes Bellermann LLP (57) ABSTRACT

The present description provides data analysis for machine maintenance scheduling. For example, dynamic maintenance intervals are assigned for each machine being scheduled. Then, a system is provided for implementing a particle swarm optimization for finding an optimized maintenance schedule. In the optimization, an objective function is defined for maximizing production while minimizing relative maintenance cost.

20 Claims, 3 Drawing Sheets

MACHINE MAINTENANCE OPTIMIZATION WITH DYNAMIC MAINTENANCE INTERVALS

TECHNICAL FIELD

This description relates to data analysis for machine maintenance scheduling.

BACKGROUND

High volumes of data are captured, stored, and available for use in various types of decision-making. However, it is often difficult or impossible for human users of such data to interpret and apply the data, and to engineer computers to operate based on the data and in a manner that optimizes use of the available data.

Computers are often used in various types of scheduling operations, and many such scheduling operations are straightforward. In some contexts, however, it is still difficult or impossible to make large-scale, accurate, and/or timely scheduling decisions, particularly when certain scheduling constraints exist, and/or when a large number of scheduling variables are present.

For example, some scheduling data relates to machine maintenance, such as in a manufacturing or other type of production facility. There may be many machines in such a facility, such as machines for moving, assembling, painting, or otherwise manipulating goods being produced. Such machines (and individual components thereof) may have differing maintenance schedules, and may have differing maintenance aspects. If machine maintenance is scheduled poorly, unacceptable downtime of the machines (and associated production activities) may be experienced in some cases, as well as additional costs for maintaining, upgrading, or replacing machines or machine components.

SUMMARY

The present description provides data analysis for machine maintenance scheduling. For example, dynamic maintenance intervals are assigned for each machine being scheduled. Then, a system is provided for implementing a particle swarm optimization for finding an optimized maintenance schedule. In the optimization, an objective function is defined for maximizing production while minimizing relative maintenance cost.

For example, in simplified examples, a first machine may be scheduled for maintenance every 100 days, while another machine (or another component of the same machine) is scheduled every 110 days, and both machines may require production downtime for their maintenance. It is possible to schedule one machine's maintenance early, or the other's late, so as to ensure that the production downtime is minimized (e.g., both machines experience production downtime on the same days, rather than on different days). However, each option has potentially conflicting advantages and disadvantages, and it is difficult or impossible for a human operator of the machines to schedule the machine maintenance optimally. Sub-optimal scheduling can result in unnecessary costs, or unnecessary downtime, or, in some cases, can lead to machine failures (which can be dangerous, and lead to even further costs and downtime). The features described herein provide optimized machine maintenance scheduling with dynamic intervals, an a manner that is repeatable, reliable, and capable of being performed by a user without requiring extensive technical ability on the part of the user.

According to one general aspect, a computer program product is tangibly embodied on a non-transitory computer-readable storage medium and includes instructions. The instructions, when executed, are configured to cause at least one computing device to access a demand database storing a plurality of demands for maintenance schedules, each demand specifying a plurality of components for maintenance, at least one initial maintenance interval for each component of the plurality of components, and a maintenance time window. The instructions, when executed, are configured to cause at least one computing device to access a component database to obtain component data for the plurality of components, and access a machine database storing a plurality of machines composed of the plurality of components. The instructions, when executed, are configured to cause at least one computing device to execute scheduling iterations for determining an optimized maintenance schedule for the plurality of demands and the plurality of components, in which each initial maintenance interval is dynamically adjustable at each iteration in conjunction with optimizing an optimization variable. The executing includes calculating updated particles within a solution space of allowable maintenance schedules, based on a position and velocity of each particle from a preceding iteration, each particle representing an allowable maintenance schedule for a corresponding component of the plurality of components of an associated demand, calculating an updated optimization variable for each particle, and calculating an updated velocity of each particle within the solution space. Upon completion of a maximum number of iterations. The instructions, when executed, are configured to cause at least one computing device to select the optimized maintenance schedule from the executed scheduling iterations, based on a highest-obtained value of the optimization variable during the iterations.

A computer-implemented method for executing instructions stored on a non-transitory computer readable storage medium, the method comprising accessing a demand database storing a plurality of demands for maintenance schedules, each demand specifying a plurality of components for maintenance, at least one initial maintenance interval for each component of the plurality of components, and a maintenance time window. The method further comprises accessing a component database to obtain component data for the plurality of components, and accessing a machine database storing a plurality of machines composed of the plurality of components. The method further comprises executing scheduling iterations for determining an optimized maintenance schedule for the plurality of demands and the plurality of components, in which each initial maintenance interval is dynamically adjustable at each iteration in conjunction with optimizing an optimization variable. The executing includes calculating updated particles within a solution space of allowable maintenance schedules, based on a position and velocity of each particle from a preceding iteration, each particle representing an allowable maintenance schedule for a corresponding component of the plurality of components of an associated demand, calculating an updated optimization variable for each particle, and calculating an updated velocity of each particle within the solution space. The method further includes, upon completion of a maximum number of iterations, selecting the optimized maintenance schedule from the executed scheduling iterations, based on a highest-obtained value of the optimization variable during the iterations.

According to another general aspect, a system includes at least one processor; and a non-transitory computer-readable storage medium storing instructions that are executable by at the least one processor. The system further includes a maintenance schedule optimizer configured to cause the at least one processor to execute a particle swarm optimization in which each component of a plurality of components is associated with an initial maintenance interval between pairs of maintenance occurrences, and the maintenance schedule optimizer is further configured to cause the at least one processor to iteratively generate maintenance schedules for each component in which the initial maintenance interval is dynamically adjustable at each iteration between each pair of maintenance occurrences. The maintenance schedule optimizer includes a particle handler configured to associate each component with a particle representing a corresponding maintenance schedule at each iteration, and in which a number of particle dimensions corresponds to a number of maintenance occurrences in the corresponding maintenance schedule. The maintenance schedule optimizer includes an update handler configured to update a current position and current velocity for each particle at each current iteration, based on a preceding position and preceding velocity thereof during a preceding iteration.

The details of one or more implementations are set forth in the accompanying drawings and the description below. Other features will be apparent from the description and drawings, and from the claims.

DETAILED DESCRIPTION

Figure 1:
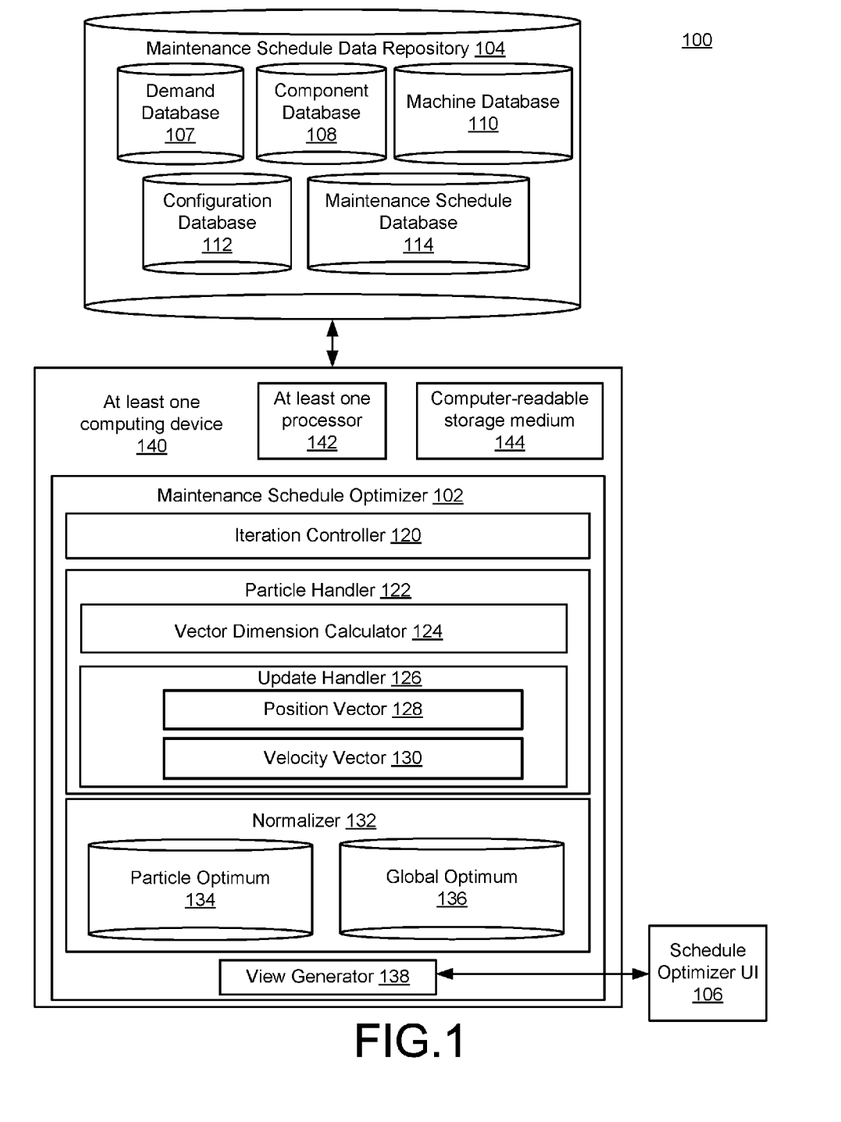
FIG. 1 is block diagram of a system for maintenance schedule optimization with dynamic maintenance intervals.

FIG. 1 is a block diagram of a system 100 for maintenance schedule optimization. In the example of FIG. 1, a maintenance schedule optimizer 102 is configured to access relevant maintenance data illustrated in FIG. 1 as being stored within a maintenance schedule data repository 104. As described in detail below, through analysis and processing of data accessed from the maintenance schedule data repository 104, the maintenance schedule optimizer 102 may be configured to provide optimized maintenance schedules to a user of the system 100, e.g., using a schedule optimizer user interface (UI) 106.

In more detail, as referenced above and described in detail below, e.g., with respect to FIG. 3, machinery maintenance is highly important for many industries, including, e.g., oil & gas, transportation, manufacturing and other industries. Furthermore, with increases of maintenance costs and machine interference constraints (where, e.g., such interference refers to situations in which maintaining one machine or machine component causes downtime of another machine or machine component in the context of a production process), it may be advantageous to schedule maintenance at the component level, in order to increase machine utility and decrease production loss.

However, in attempting to execute such scheduling, various components of the machine(s) may have various suggested maintenance intervals and maintenance times. In this context, a maintenance interval refers to how often maintenance is suggested to occur (e.g., after a specified number of days, weeks, or months), while maintenance time refers to a quantity of time needed to execute the maintenance at each interval.

Further, a given maintenance activity may be associated with what is referred to as machine interference. That is, during maintenance, some component maintenance may interfere with production processes, such as, for example, when a machine needs to be shut down during the maintenance of a specific component.

In a final example of difficulties associated with maintenance scheduling, an Impact of delaying maintenance may be quantified. For example, if a suggested maintenance is not carried out within the suggested maintenance interval, some impact from the delay may (or may not) occur. For example, a reduction in productivity and/or increase of a failure probability may occur.

Thus, if considering a simplified example using two components of a machine, it is possible to change a suggested maintenance interval for each component. For example, as in the example above, if a first machine component is suggested by a manufacturer for maintenance every 100 days, while a second is suggested for maintenance every 110 days, a number of possibilities exist for maintenance scheduling, each with associated advantages and disadvantages, so that an overall trade-off is required.

For example, if the first component is maintained on day 100 and the second component on day 110, and both have maintenance times of two days, the machine may need to be shut down for four days total, which may cause an unacceptable production loss. In another option, both components may be maintained simultaneously on day 100, so the machine only needs to be shut down for 2 days. However, the second component, in this example, is maintained 10 days early, implying a decrease of its maintenance interval and increase of overall maintenance cost. In a final example, both components may be maintained simultaneously on day 110, so the machine is again shut down for only 2 days. However, in this last example scenario, the maintenance of the first component is delayed for ten days, which may cause a reduction in production and/or increase of failure probability.

Therefore, it is important for companies to optimize maintenance scheduling, in order to increase machine utility and decrease production loss. To this end, the maintenance schedule optimizer 102 is configured to generate such maintenance schedules, using dynamic maintenance intervals and considering various dependencies of maintenance intervals, various machine interferences, and various delay impacts.

In this context, a dynamic (maintenance) interval is designed for each component, instead of static maintenance intervals. As a result, the maintenance interval of each component varies during the considered time period.

With these and other maintenance scheduling variables potentially being present, it often occurs that, even for a relatively small quantity of machines/components and maintenance activities, a number of possible scheduling solutions may grow exponentially/non-linearly, quickly exceeding an ability of a human operator to generate optimal or even acceptable scheduling solutions. For example, a human user may not be able to generate a feasible maintenance schedule within an available amount of time. Further, a human operator might generate schedules that violate constraints, or may generate a schedule that, while in conformance with relevant constraints, takes significantly longer and is significantly more expensive than other potential solutions.

With respect to FIG. 1, the maintenance schedule data repository 104 illustrates a number of different types of relevant data that may be utilized (or produced) by the maintenance schedule optimizer 102. More detailed examples illustrating a content and format of some of the various databases of the maintenance schedule data repository 104 are provided below.

For purposes of the simplified example of FIG. 1, the maintenance schedule data repository 104 is illustrated as including a demand database 107. As described below, the demand database 107 may include specific components and/or machines that are to be scheduled for maintenance. For example, a user of the schedule optimizer UI 106 may identify specific machine components for dynamic scheduling. In other examples, the user may specify types or classes of machine components for maintenance, or may simply specify all available components. The demand database 107 also may specify various other input parameters, such as a total time window for maintenance to occur.

The demand database 107 may be used in operation in conjunction with a component database 108 and a machine database 110. That is, as shown, the maintenance schedule data repository 104 is also illustrated as including the component database 108. The component database 108 may include, for each component, a unique component identifier, an associated machine in which the component is included, and various ones of the parameters referenced herein, including a suggested maintenance interval, cost per maintenance, and time required for each maintenance. The component database 108 also may include an indication or characterization of whether the associated machine for each component must be shut down during maintenance, and/or an indication of an extent to which an overall efficiency of the machine is reduced in the event of a delayed maintenance activity (e.g., becomes only 90% productive in conjunction with a specific maintenance delay).

Further, the machine database 110 may be used to store references and descriptions of specific machines. The machine database 110 may include unique machine identifiers and total production in a given time period with 100% availability.

A configuration database 112 refers to storage for parameters governing operations of the maintenance schedule optimizer 102. Examples of configuration data are provided below.

Finally with respect to the maintenance schedule data repository 104, a maintenance schedule database 118 may be configured to store information relevant to operations and outputs of the maintenance schedule optimizer 102. For example, the maintenance schedule database 118 may store the final maintenance schedules generated by the maintenance schedule optimizer 102, and displayed using the schedule optimizer UI 106. In various implementations, the maintenance schedule database 118 also may store intermediate results that are calculated and utilized by the maintenance schedule optimizer 102.

In operation, as described in detail below, the maintenance schedule optimizer 102 explores a solution space of allowable maintenance schedules, including dynamic scheduling intervals. That is, a maintenance schedule is generally defined as an identity of a machine/component(s), and a number of days after which the specified machine/component is maintained (i.e., maintenance interval). Then, each feasible or allowable maintenance schedule for a plurality of machine components may be understood to represent a position within an entire solution space of available maintenance schedules, where the maintenance schedule optimizer 102 is configured to begin operations based on an initial or beginning solution (position(s)), and thereafter iterate through different solutions/positions.

More specifically, a manner in which the maintenance schedule optimizer 102 explores the maintenance schedule solution space using defined, initial positions may then be understood by way of analogy with a swarm or other type of collective behavior exhibited, e.g., by birds or other animals. For example, when a flock of birds explores a physical space, e.g., for food gathering or migration purposes, each bird may be considered to have a physical position or location, as well as a velocity. Then, it may occur that each bird finds two or more food sources. For each such bird, one food source may be better than the others. For the flock of birds as a whole, one food source will be the overall best available food source.

In swarm or collective behavior, the birds tend to adjust their positions within the physical area based on attempts to identify and gather from the individual or overall best-available food sources. Although the birds may or may not locate the actual, single best food source within the geographical area, this type of collective behavior typically results in more frequently locating an acceptable or superior food source then would be located by an individual bird exploring the same geographical area for the same amount of time.

For purposes of FIG. 1, then, the analogy proceeds by considering any selected, feasible maintenance schedule solution to be a particle at a "position" within an overall solution space of feasible maintenance schedules. An iteration controller 120 then executes a number of iterations, where, at each iteration, each particle moves with a certain "velocity" to a new position (i.e., feasible maintenance schedule) within the solution space. Carrying the analogy further, the "food" sought by these particle movements may be represented using an optimization variable. For example, an objective function may be defined for optimizing a production (e.g., construction, assembly, and/or shipment of one or more products for sale) while minimizing machine maintenance costs. Just as the bird movements are dictated by a best food source located by each bird, and by a best overall or global food source found by any bird, the updated position and velocity of each particle may be determined at each iteration of the iteration controller 120 based on a best (e.g., maximum) value of the optimization variable for each particle, and at overall or global best value for the optimization variable for any particle.

In more detail, a particle handler 122 may include a vector dimension calculator 124, where the vector refers to the overall position and velocity of each particle of the overall solution set, and the dimension refers to the number of possible or allowable maintenance events or occurrences for each component during an overall maintenance time window. For example, if a total maintenance time window for a component in an implementation of FIG. 1 is 6 months, and the particular machine component has a suggested maintenance interval of 2 months, then the number of suggested maintenance occurrences would be 3 occurrences. In FIG. 1, as referenced above, the maintenance interval is dynamic and can change, so that the maintenance intervals might be changed from a static 2 months to 6 weeks, followed by 7 weeks, followed by 8 weeks, etc. Consequently, there may be more or fewer maintenance occurrences within the maintenance time window.

In this context, the vector dimension(s) should be understood to refer to a range (e.g., maximum) number of maintenance occurrences that may occur during the maintenance time window for a particular component. By setting a maximum number of dimensions, the overall solution space is constrained in a reasonable way, so that computational time and resources are not wasted or used inefficiently in calculating solutions that are impractical or undesirable (e.g., solutions in which maintenance occurrences happen every week). Specific example techniques for calculating the number of dimensions are provided below, in conjunction with FIG. 3.

An update handler 126 is configured, in each iteration, to update values for a position vector 128 and a velocity vector 130. As just described, and as explained in more detail below, each such position vector and velocity vector will be associated with a set of maintenance scheduling solutions for a corresponding set of machine components.

In this regard, in practice, it will be appreciated that there may be a number of different techniques available for representing a relevant set of maintenance intervals, when constructing the vectors 124, 126. Also in practice, it will be appreciated that an entirety of a maintenance schedule solution space generally includes a continuum of values, whereas allowable, feasible solutions may be restricted to only integer values.

For example, the update handler 126 may calculate a position vector having a value of 49.1 days as a calculated maintenance interval, when, in practice, maintenance occurrences are scheduled in terms of days. In these and similar scenarios, since such calculated solutions do not correspond to feasible maintenance schedules, a normalizer 132 may be configured to perform an encoding/decoding representation of ensuring feasible maintenance schedule solutions are reached. For instance, in the example just given, a normalizer 132 may save the maintenance interval as having a value of "50," e.g., may raise the real number to the next-highest integer value.

With these normalized values, the normalizer 132 may store a particle optimum 134 for each particle. As described, the particle optimum 134 represents a best value for a relevant optimization variable for each particle, across all iterations including that particle.

In other words, as described in detail below, as the iteration controller 120 executes multiple iterations, each particle will move to a new position at each iteration, and will have a corresponding, calculated value for its associated optimization variable at that position. Thus, the particle optimum 134 represents, for each particle, the best value for the optimization variable across all such iterations.

Similarly, a global optimum 136 represents a best value for the optimization variable across all particles and across all executed iterations. With respect to the global optimum 136, as well as the particle optimum 134, it will be appreciated that it is not necessary for the normalizer 132 to store all of the calculated optimization variable values across all the iterations. Instead, as described in detail below, the normalizer 132 may simply store a single best value for each particle, and globally, and simply update any such value at any time that a current iteration exceeds that value.

In practice, the iteration controller 120 may be configured to execute a predefined or maximum number of iterations, and to output one or more resulting maintenance schedules upon completion thereof. In additional or alternative example implementations, the iteration controller 120 may cease executing iterations when a certain level of the optimization variable value (e.g., profit) is reached, or in response to some other termination condition.

Further in FIG. 1, a view generator 138 is configured to generate the schedule optimizer UI 106, and thereby illustrate the determined, optimized maintenance schedule. In this regard, it will be appreciated that the schedule optimizer UI 106 may be configured to display calculated maintenance schedules. Additionally, the schedule optimizer UI 106 may provide functionality allowing a user of the system 100 to select between two or more generated maintenance schedules. Further, the schedule optimizer UI 106 may be configured to enable a user of the system 100 to alter various configuration parameters (stored using configuration database 112) governing operations of the maintenance schedule optimizer 102, some of which are described below.

In the example of FIG. 1, the maintenance schedule optimizer 102 is illustrated as being executed at least one computing device 140, which itself is illustrated as including at least one processor 142, as well as a non-transitory computer readable storage medium 144. Of course, the at least one computing device 140 is intended to provide a simplified example illustrating a transformation of a general purpose computing device into a special purpose computing device by the maintenance schedule optimizer 102. As such, many conventional hardware and/or software components of the at least one computing device 140 are not illustrated in the simplified example of FIG. 1, such as, for example, a monitor or other display that may be utilized to provide the schedule optimizer UI 106, various input/output devices, and various hardware/software for executing network communications.

In the latter regard, it will be appreciated that the at least one computing device 140 may represent two or more computing devices operating in parallel, and connected by a public or private computer network. For example, some portions of the maintenance schedule optimizer 102 may be executed at a server having a relatively high level of hardware resources, while other parts of the maintenance schedule optimizer 102 may be executed locally at a client device of the user of the system 100.

Further, two or more computing devices, or two or more processors represented by the at least one processor 142, may be configured to implement operations of the maintenance schedule optimizer 102 in parallel. For example, operations of the particle handler 122 in calculating mutations or updates of the various particles may be executed in parallel.

The non-transitory compute readable storage medium 144 may be understood to store instructions, that, when executed by the at least one processor 142, provide execution of the maintenance schedule optimizer 102. In additional or alternative examples, the computer readable storage medium 144 may be used to store various types of relevant data, including the schedule data repository 104.

Although the maintenance schedule optimizer 102 of FIG. 1 illustrates a number of separate, discrete components and sub-components, it will be appreciated that such illustration is merely for the sake of non-limiting example. In other example implementations, any two or more of the various components of the maintenance schedule optimizer 102 may be combined for execution as a single component. Conversely, it may occur that any single component or sub-component of the maintenance schedule optimizer 102 may be divided for execution of two or more separate components or sub-components.

Figure 2:
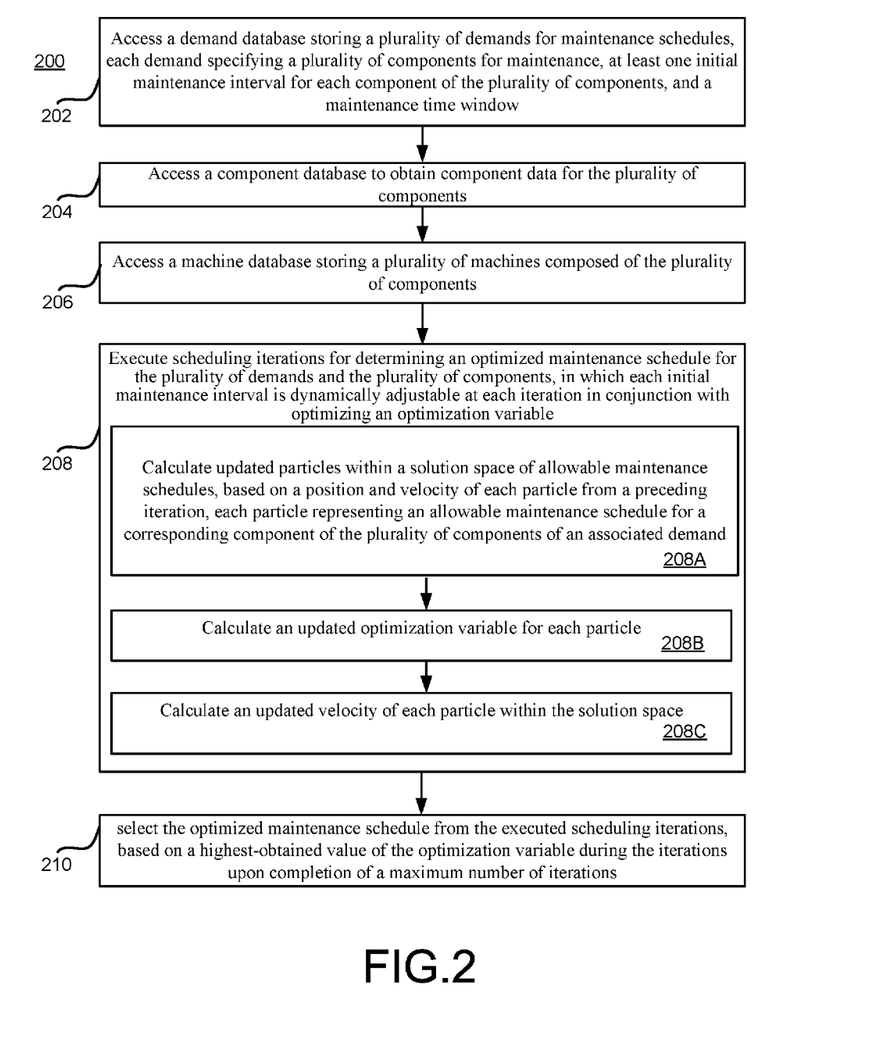
FIG. 2 is a flowchart illustrating example operations of the system of FIG. 1.

FIG. 2 is a flowchart 200 illustrating example operations of the system 100 of FIG. 1. In the example of FIG. 2, operations 202-212 are illustrated as separate, sequential operations. However, it will be appreciated that in various implementations, additional or alternative operations may be included, one or more operations or sub-operations may be omitted, and the various operations may be executed in an order different than that shown. In all such implementations, any two or more operations or sub-operations may be executed in a partially or completely overlapping or parallel manner or in a nested, iterative, looped, or branched fashion.

In the example of FIG. 2, a demand database storing a plurality of demands for maintenance schedules may be accessed, each demand specifying a plurality of components for maintenance, at least one initial maintenance interval for each component of the plurality of components, and a maintenance time window (202). For example, the maintenance schedule optimizer 102 may access the demand database 107. As described, demands may be received from a user by way of the schedule optimizer UI 106, and may specify a set of individual components, a class or type of component, components at a particular location or site, or any other suitable technique for identifying components requiring maintenance scheduling.

A component database may be accessed to obtain component data for the plurality of components (204). For example, the maintenance schedule optimizer 102 may access the component database 108. In this context, the term component may refer to a part, portion, or sub-assembly of a single larger machine or assembly, or may refer to a machine that is itself a component of a larger assembly of machines. For example, a robotic arm used to transport items in a manufacturing facility may be considered a component of an assembly of robotic arms used in conjunction with a conveyer, or could be considered a machine in its own right, with multiple components of its own.

A machine database storing a plurality of machines composed of the plurality of components may be accessed (206). For example, the maintenance schedule optimizer 102 may access the machine database 110. As just referenced, machines stored using the machine database 110 also may be stored as components of larger machines or assemblies, using the component database 108.

Scheduling iterations for determining an optimized maintenance schedule for the plurality of demands and the plurality of components may be executed, in which each initial maintenance interval is dynamically adjustable at each iteration in conjunction with optimizing an optimization variable (208). For example, the iteration controller 120 may determine each initial maintenance interval using a suggested maintenance interval provided by a manufacturer, or another suitable value. As described in detail herein in conjunction with FIG. 3, the optimization variable may be defined in terms of a production of each components and/or machine, relative to a maintenance cost incurred, where the production may be further defined, for example, taking into account production lost due to maintenance delays (e.g., when machine experiencing delayed maintenance operates below peak efficiency until maintenance occurs) and/or due to downtime of one component resulting from maintenance of another component of the same machine (referred to herein as interference).

The executing of the iterations may include calculating updated particles within a solution space of allowable maintenance schedules, based on a position and velocity of each particle from a preceding iteration, each particle representing an allowable maintenance schedule for a corresponding component of the plurality of components of an associated demand (208A). For example, the update handler 126 may be configured to calculate the updated position vector 128, including a subvector corresponding to each component and representing that component's maintenance schedule at that iteration.

The executing of the iterations also may include calculating an updated optimization variable for each particle (208B). For example, the update handler 126 may calculate the current value for the optimization variable, based on the updated position vector.

The executing of the iterations also may include calculating an updated velocity of each particle within the solution space (208C). For example, the update handler 126 may calculate the updated velocity vector 130. As described, the updated velocity vector 130 may thus serve as a basis for calculating the further-updated position vector of the subsequent iteration, if any.

Upon completion of a maximum number of iterations, the optimized maintenance schedule may be selected from the executed scheduling iterations, based on a highest-obtained value of the optimization variable during the iterations (210). For example, the normalizer 132 may store the particle optimum values 134 and the global optimum value(s) 136 at each iteration. For each particle, the particle optimum 134 will be updated if the current value of the optimization variable is an improvement over any or all previous optimization variable values. The global optimum 136 will of course also be updated when one of the updated optimization variables has a value representing an improvement over all previously-calculated optimization variable values for all particles and all iterations. Both the particle optimum 134 and the global optimum 136 may be used at each iteration to calculate updated vectors 128, 130 for the next, subsequent iteration. As a result, a current updated particle will "follow" best-known maintenance schedule solutions within the solution space, thereby exhibiting advantageous aspects of the swarm or collective behavior referenced in the analogy above. Further, at a final iteration, the currently-stored global optimum value of the optimization variable may be retrieved as the optimized maintenance schedule.

The iteration controller 120 may determine the maximum number of iterations as a predefined value, or based on a maximum allowed time for iterations to execute, or on a particular value for the global optimum 136 being reached, or on a maximum number of iterations executed for which the value of the global optimum 136 remains within a predefined range. Of course, other criteria for determining the maximum number of iterations may be utilized, including combinations of any of the just-referenced examples.

Figure 3:
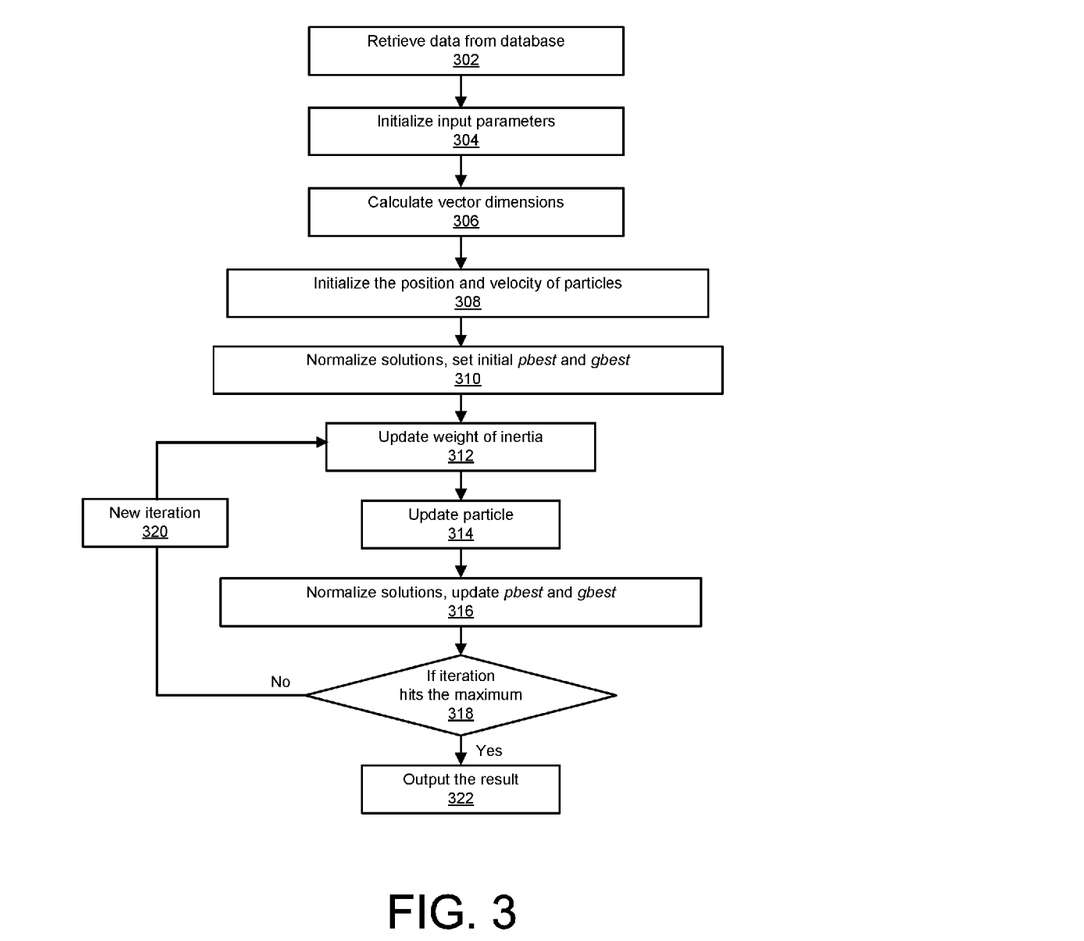
FIG. 3 is a flowchart illustrating more detailed example operations of the system of FIG. 1.

FIG. 3 is a flowchart illustrating more detailed examples of operations of the system 100 of FIG. 1. In the example of FIG. 3, the following example mathematical notations provided in Table 1 are used:

TABLE 1

| Notation | Description |
| --- | --- |
| $Co_i$ | Component i $i = 1, 2, \ldots, N$ |
| $S_i$ | Suggested maintenance interval of component i |
| $C_i$ | Maintenance cost of component i in one time unit |
| $T_i$ | Maintenance time units of component i |
| $M_i$ | Machine interference of component i |

TABLE 1-continued

| Notation | Description |
|---|---|
| $M_i = \begin{cases} 1 & \text{if maintenance of } Co_i \text{ interferes with production} \\ 0 & \text{otherwise} \end{cases}$ | |
| $I_i$ | Impact of delay maintenance of component i |
| P | Production by time unit |
| $U_k$ | Time unit k<br>k = 1, 2, ..., L |
| $D_i$ | Vector dimensions of component i |
| $O_i$ | Maintenance occurrences of component i |
| $Z_{ij}$ | Dynamic maintenance interval j of component i<br>i = 1, 2, ..., N<br>j = 1, 2, ..., $O_i$ |
| $Y_{ik}$ | Productivity of component i at time unit k<br>i = 1, 2, ..., N<br>k = 1, 2, ..., L |
| $Y_{ik} = \begin{cases} 0 & \text{if } Co_i \text{ is maintained at } U_k \text{ and } M_i = 1 \\ D_i & \text{if } Co_i \text{ is out of maintenance at } U_k \\ 1 & \text{otherwise} \end{cases}$ | |
| A | Maintenance occurrence factor (input parameter); if suggested number of maintenance occurrences is 3 and A = 2, the maximum calculated maintenance occurrence will be 3 * 2 = 6 |
| B | Maintenance interval factor (input parameter); if suggested maintenance interval is 20 time units and B = 3, the maximum calculated maintenance interval will be 20 * 3 = 60 time units |

As shown in Table 1, it is assumed that a machine includes N components denoted as $Co_i$, for i=1, 2, ..., N. The suggested maintenance interval $S_i$ refers to, for example, a manufacturer-suggested or other default maintenance interval of a corresponding component. A maintenance cost $C_i$ refers to a cost (e.g., parts and labor) of a corresponding maintenance event.

A maintenance time $T_i$ refers to a quantity of time required to complete a particular maintenance of a corresponding component, during which the component (and perhaps other related components, or the machine as a whole) may be non-operational and non-productive (e.g., experience downtime). $T_i$ may be expressed in whatever time unit (e.g., hours, or days) is used consistently throughout the related calculations. The overall time window during which the maintenance scheduling will occur may be divided into L time units, i.e., $U_k$, k=1, 2, ..., L. A production by time unit is expressed as P.

Machine interference $M_i$, as described, refers to a manner and extent to which maintenance on one component or machine causes a partial or complete downtime of another component or machine. Meanwhile, delay impact $I_i$ refers to an impact of a maintenance delay on a productivity of a component or machine. For example, if a machine is operating at 100% of its expected production schedule, and a component that is suggested for maintenance at 100 days is not maintained until 110 days, then during the intervening 10 days, the component may operate at a reduced efficiency or productivity, e.g., 90%.

Thus, the above referenced parameters of Table 1 represent input or given values for the maintenance schedule optimizer 102. The subsequent four parameters ($D_i$, $O_i$, $Z_{ij}$, and $Y_{ik}$) refer to calculated or determined parameters some of which may change as iterations are executed. Specifically, a value $D_i$ represents a number of vector dimensions of a component i, where, as referenced above and described in detail below, the number of vector dimensions corresponds to the number of maintenance occurrences calculated for that component (although some of these calculated maintenances occurrences $O_i$ may be filtered out if they fall outside of the overall time window L, as also described below).

A maintenance schedule solution for a given component i (for each of the N total components) having dynamic maintenance intervals j in between each pair of maintenance occurrences $O_i$ may be written as $Z_{ij}$, as shown in Table 1.

Also in Table 1, a variable $Y_{ik}$ represents a productivity of a component i at a time unit k, where it will be appreciated that the value of $Y_{ik}$ may vary depending on, e.g., whether the component is in maintenance at the given time unit, or whether the component is experiencing a maintenance delay (so that the production impact I occurs).

Finally in Table 1, parameters A and B represent constants selected by a user of the system 100 to set maximum values for maintenance occurrences and maintenance intervals, respectively. In other words, these are set as ceilings to avoid any clearly undesirable or impractical outcomes from the calculations of the maintenance schedule optimizer 102.

With the notation of Table 1, it is possible to express an objective function governing a value of a corresponding optimization variable. For example, Equation provides such an example objective function:

$$\text{Maximize}\left(\sum_{i=1}^{N}\sum_{k=1}^{L}Y_{ik}P - \sum_{i=1}^{N}C_iT_iO_i\right) \quad \text{Equation 1}$$

As shown in Equation 1, the production value $\sum_{i=1}^{N}\sum_{k=1}^{L}Y_{ik}P$ represents a quantity of the goods/items being produced, while the cost factor $-\sum_{i=1}^{N}C_iT_iO_i$ refers to the maintenance cost incurred. It may be understood that a reduction in the production value also may be considered as a cost, i.e., an opportunity cost. Consequently, Equation 1 provides an objective function in which a relative production value is maximized in comparison with the maintenance cost factor(s).

Meanwhile, for the sake of a more specific example, Table 2 illustrates an example database table and format that may be used as the component database 108.

TABLE 2

| Column name | Description |
|---|---|
| Component ID | Identity of component |
| Machine ID | Identity of machine |
| Component name | Name of component |
| Maintenance interval | Suggested interval between two maintenance occurrences |
| Maintenance cost | Cost of maintenance in one time unit |
| Maintenance time | Time needed for maintenance |
| Machine interference | Whether the machine needs to be shut down during maintenance |
| Delay impact | Impact of delay maintenance, e.g., 0.9 means if the maintenance is delayed to the next interval, the machine productivity will decrease to 90% |

Somewhat similarly, Table 3 illustrates an example format for the machine database 110 of FIG. 1.

TABLE 3

| Column name | Description |
|---|---|
| Machine ID | Identity of machine |
| Machine name | Name of machine |
| Daily production | Daily production with 100% productivity |

As a final example of a relevant database table format, Table 4 shows an output maintenance scheduling, such as may be stored using the maintenance schedule database 114.

TABLE 4

| Column name | Description |
|---|---|
| Component ID | Identity of component |
| Maintenance No | Maintenance number |
| Maintenance start time | Start time of maintenance |

As referenced above, the notation of Table 1 also may be used to encode maintenance schedule solutions, to thereby obtain the position vector 128 and the velocity vector 130. Initial results of such encoding operations for a sample scenario are provided below, with respect to Table 5 and 6.

That is, for each component, the number of vector dimensions can be defined using Equation 2:

$$D_i = \left\lceil \frac{AL}{S_i} \right\rceil \qquad \text{Equation 2}$$

As described above with respect to Table 1, the parameter A is used to set a maximum number of maintenance occurrences (i.e., minimum maintenance interval between maintenance occurrences), relative to the suggested maintenance interval $S_I$ and considering the total maintenance schedule time window L. Accordingly, the dynamic number of dimensions may vary for each component.

For example, for N components, $\Sigma_{i=1}^{N} D_i$ vector dimensions are used to describe the position of a particle, including the position representing the optimized solution (maintenance schedule). In other words, both the position vector X and the velocity vector V will have $\Sigma_{i=1}^{N} D_i$ dimensions. Furthermore, those dimensions can be grouped into N sub-vectors $X_i$, i=1,2, ..., N. Each component $Co_i$ has one sub-vector $X_i$. Similar comments apply to the velocity vector V.

The following example illustrates how $\Sigma_{i=1}^{N} D_i$ dimensions can present the solution, i.e., the position vector X. For two components $Co_1$ and $Co_2$, it may occur that $S_1=100$, $S_2=130$, L=250, A=2. Then $D_i$ may be calculated as (2*250)/100=5, while $D_2$ may be calculated as (2*250)/130=4.

Tables 5 and 6 give examples of two sub-vectors $X_1$ and $X_2$ illustrating the just-calculated dimensions of $D_1=5$ and $D_2=4$.

TABLE 5

| | Maintenance No. of $Co_1$ | | | | |
|---|---|---|---|---|---|
| | 1 | 2 | 3 | 4 | 5 |
| $X_1$ | 50 | 70 | 60 | 70 | 90 |

TABLE 6

| | Maintenance No. of $Co_2$ | | | |
|---|---|---|---|---|
| | 1 | 2 | 3 | 4 |
| $X_2$ | 120 | 130 | 100 | 110 |

In the above example, the machine includes two components $Co_1$ and $Co_2$ and those two sub-vectors $X_1$ and $X_2$ presented in Tables 5 and 6 illustrate the following maintenance scheduling solution (where $X_{ij}$ refers to the dynamic maintenance interval):

$X_{11}=50$, $X_{12}=70$, $X_{13}=60$, $X_{14}=70$, $X_{15}=90$, and $X_{21}=120$, $X_{22}=130$, $X_{23}=100$, $X_{24}=110$. That is, each of the above values represents an amount of time (e.g., days) since the last maintenance. For example, in Table 5, the first maintenance is scheduled for 50 days, while the second maintenance is listed as 70 days. Here, the notation means that the second maintenance occurs 70 days after the 50 days of the first maintenance, or 120 days total from a start time. Similarly, the third, fourth, and fifth would occur at 180, 250, and 340 days.

However, when providing an actual maintenance schedule result, values that exceed the total time window L=250 can be filtered out. In other words, $X_{ij}$ is converted to $Z_{ij}$, as shown in Equation 3:

$$Z_{ij} = \begin{cases} X_{ij} & \sum_{h=1}^{j} X_{ih} \leq L \\ \text{null} & \text{otherwise} \end{cases} \qquad \text{Equation 3}$$

So, in a final result, a value in brackets is used to demonstrate a current time unit of the maintenance. In the example, $X_{15}$, $X_{23}$, $Z_{24}$ are filtered, since their current time units are greater than L (e.g., $X_{15}$=340 is greater than the maximum L=250. Accordingly, the following values for a final solution may be determined:

$Z_{11}$=50 (50), $Z_{12}$=70 (120), $Z_{13}$=60 (180), $Z_{14}$=70 (250), and
$Z_{21}$=120 (120), $Z_{22}$=130 (250)

During the iterative calculations referenced above and described in more detail below with respect to FIG. 3, each vector X (or sub-vector $X_1$) may be calculated as real numbers, but the value of each dimension in the vector X may be normalized by the normalizer 132 to raise a real number [x] to the next highest integer value.

For example, Tables 7, 8, 9, and 10 illustrate the normalization process. In Tables 7 and 8, prior to a normalization, 4 dimensions are included in Table 7 (because the 5$^{th}$ value was filtered out as being outside the maximum time window L), while 2 dimensions are included in Table 8 (because the 3$^{rd}$ and 4$^{th}$ values were filtered as being outside the maximum time window L).

The following example shows the process of normalization. As just referenced, Tables 7 and 8 illustrate vectors before the normalization:

TABLE 7

| | Maintenance No. of $Co_1$ | | | |
|---|---|---|---|---|
| | 1 | 2 | 3 | 4 |
| $X_1$ | 49.1 | 69.9 | 60.0 | 69.5 |

TABLE 8

| | Maintenance No. of $C_2$ | |
|---|---|---|
| | 1 | 2 |
| $X_2$ | 19.3 | 29.8 |

After the normalization process is completed, integer values are obtained, as shown in Tables 9 and 10 and corresponding to filtered versions of Tables 5 and 6:

TABLE 9

| | Maintenance No. of $C_1$ | | | |
|---|---|---|---|---|
| | 1 | 2 | 3 | 4 |
| $X_1$ | 50 | 70 | 60 | 70 |

TABLE 10

| | Maintenance No. of $C_2$ | |
|---|---|---|
| $X_2$ | 20 | 30 |

When calculating the objective function using Equation 1, then, it may be observed that the output filter described above also will be may also be applied to filter the useless values that fall outside of the time window L.

In the example of FIG. 3, then, the various required and desired data may be retrieved (302), e.g., from Tables 2 and 3, above. For example, the relevant component and machine identifiers are retrieved, the suggested maintenance interval, maintenance costs for a given component, and maintenance time units (durations) are retrieved. Similarly, a machine interference for each component i, an impact delay, and a production by time unit variable(s) all may be retrieved.

Initialized input parameters may then be obtained (304). For example, the following input parameters may be initialized: $I_{max}$ that defines a maximum number of iterations, $N_p$ that defines a number of particles (components), and $w_i$ that defines a weight of inertia for a corresponding $X_i$. Further, values may be set for learning parameters $c_1$, $c_2$ (a use of the values w, $c_1$, $c_2$ is provided in more detail, below). Also, values for the maintenance occurrence factor A and the maintenance interval factor B may be obtained, as referenced with respect to Table 1.

Then, the (dynamic) vector dimensions may be calculated (306). For example, as described above, for all components, vector dimensions $V_i$ for sub-vector $V_i$ may be calculated with Equation 2, i.e., $D_i=[AL/S_i]$ The position vector X and velocity vector V of all particles may be calculated (308) according to the constraints of Equation 4:

$$0 < X_{ij} \leq BS_i, j=1,2,\ldots, V_i$$

$$-BS_i < V_{ij} \leq BS_i, j=1,2,\ldots, V_i \quad \text{Equation 4}$$

Then in FIG. 3, the initial solution may be normalized by the decoding method described above, and (for each particle), pbest and gbest may be set to the current position (310). The initial value for gbest may be set to the current optimal position of the particle with a maximum value of the objective function.

At progression to the next iteration, t=t+1, the weight of inertia w may be updated (312) using Equation 5:

$$w_i' = w_i \frac{(I_{max} - t)C}{I_{max}T_iC_i} \quad \text{Equation 5}$$

In this context, as referenced above, the value w for weight of inertia represents a limitation on a velocity of each particle. Conceptually, the value w has an effect that, over time, and/or as a maximum number of iterations is approached, a particle velocity will decrease relatively more slowly, so that the corresponding position of the particle changes less drastically with each iteration. In other words, the effect is that a particle moves more slowly as the particle approaches a final, optimized solution.

Then, the velocity and position of each particle may be updated (314) according to Equation 6:

$$V_i'=w_iV_i+c_1r_1(pbest_i-X_i)+c_2r_2(gbest_i-X_i)$$

$$X_i'=X_i+V_i' \quad \text{Equation 6}$$

That is, as shown, the updated velocity may be calculated, and then used to calculate the updated position. In Equation 6, $V_i$ and $X_i$ are vectors before the update, while $V_i'$ and $X_i'$ are vectors after the update. If $V_i'$ or $X_i'$ breaks the constraints in Equation 4, it/they may be replaced with a boundary value(s). Also, in Equation 6, the parameters $c_1$ and $c_2$ are scaling parameters, and may also be referred to as learning parameters. Meanwhile, $r_1$ and $r_2$ represent random number between 0 and 1.

Then, the result may be normalized using the normalization techniques described above, including implementing the decoding technique and filtering of values beyond the time window L, so that values of the objective function (optimization variable) may be obtained, and pbest and gbest may be updated, if needed (316). Specifically, if the value of objective function is greater than the value of pbest, update pbest accordingly. If the value is even greater than the value of gbest, update gbest accordingly, as well.

If the current iteration reaches the maximum iteration $I_{max}$ (318), then the current value of gbest may be provided as the optimized maintenance schedule solution (322). Otherwise (320), iterations may continue until the maximum iteration is reached.

The following pseudo code represents example pseudo code for implementing the flowchart 300 of FIG. 3.

```
1    Function scheduleMaintenance(Components, Machines,
     MachineID):
2    % Input:    Components - Set of components
3               Machines - Set of machines
4               MachineID - Machine ID
5    % Output:   Scheduling - Maintenance scheduling
6    t = 0;
7    Initialize input parameters including Np, w, c1, c2
8    Calculate vector dimensions
9    For each particle in particle set
10       Initialize position vector X and velocity vector V
11       Normalize solution
12       Set initial pbest
13   End for
14   Set initial gbest
15   While t < maximum iteration
16       t = t + 1;
17       Update w;
18       For each particle in particle set
19           Update the position and velocity of particle
20           Normalize solution
21           Update pbest
22       End for
23       Update gbest
24   End while
25   Return gbest.
26
```

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:

access a demand database storing a plurality of demands for maintenance schedules, each demand specifying a plurality of components for maintenance, at least one initial maintenance interval for each component of the plurality of components, and a maintenance time window;

access a component database to obtain component data for the plurality of components;

access a machine database storing a plurality of machines composed of the plurality of components;

execute scheduling iterations for determining an optimized maintenance schedule for the plurality of demands and the plurality of components, in which each initial maintenance interval is dynamically adjustable at each iteration in conjunction with optimizing an optimization variable, and wherein the executing includes calculating updated particles within a solution space of allowable maintenance schedules, based on a position and velocity of each particle from a preceding iteration, each particle representing an allowable maintenance schedule for a corresponding component of the plurality of components of an associated demand, calculating an updated optimization variable for each particle, calculating an updated velocity of each particle within the solution space, and upon completion of a maximum number of iterations, select the optimized maintenance schedule from the executed scheduling iterations, based on a highest-obtained value of the optimization variable during the iterations.

2. The computer program product of claim 1, wherein the instructions, when executed, are further configured to cause the at least one computing device to execute a scheduling iteration of the scheduling iterations, including:

calculating, for a current iteration of the scheduling iterations, a best particle position for a particle within the solution space, as compared to particle positions of preceding iterations for the particle, and judged using its corresponding optimization variable in the solution space.

3. The computer program product of claim 2, wherein the instructions, when executed, are further configured to cause the at least one computing device to execute a scheduling iteration of the scheduling iterations, including:

calculating, for a current iteration of the scheduling iterations, a global best particle position for all particles within the solution space, as compared to particle positions of preceding iterations for all particles and judged using optimization variables for all particles in the solution space.

4. The computer program product of claim 3, wherein the instructions, when executed, are further configured to cause the at least one computing device to execute a scheduling iteration of the scheduling iterations, including:
calculating the updated velocity of each particle, based on the best particle position and the global best particle position corresponding thereto.

5. The computer program product of claim 1, wherein the optimization variable is calculated in terms of a production predicted to be achieved by a corresponding component in conjunction with a corresponding maintenance schedule, relative to a maintenance cost associated therewith.

6. The computer program product of claim 5, wherein the production is predicted based on a machine interference of downtime of a corresponding machine during maintenance of the corresponding component.

7. The computer program product of claim 5, wherein the production is predicted based on an impact of delaying a maintenance occurrence for a component due to the dynamically adjustable maintenance interval on a production efficiency associated with the component.

8. The computer program product of claim 1, wherein the instructions, when executed, are further configured to cause the at least one computing device to:
define the plurality of particles including encoding each position vector as a component subvector having a maximum number of dimensions based on a maximum number of maintenance occurrences within the maintenance time window, defined with respect to the initial maintenance interval.

9. The computer program product of claim 8, wherein the instructions, when executed, are further configured to cause the at least one computing device to:
filter a calculated maintenance occurrence of the component subvector that falls outside of the maintenance time window.

10. A computer-implemented method for executing instructions stored on a non-transitory computer readable storage medium, the method comprising:
accessing a demand database storing a plurality of demands for maintenance schedules, each demand specifying a plurality of components for maintenance, at least one initial maintenance interval for each component of the plurality of components, and a maintenance time window;
accessing a component database to obtain component data for the plurality of components;
accessing a machine database storing a plurality of machines composed of the plurality of components;
executing scheduling iterations for determining an optimized maintenance schedule for the plurality of demands and the plurality of components, in which each initial maintenance interval is dynamically adjustable at each iteration in conjunction with optimizing an optimization variable, and wherein the executing includes
calculating updated particles within a solution space of allowable maintenance schedules, based on a position and velocity of each particle from a preceding iteration, each particle representing an allowable maintenance schedule for a corresponding component of the plurality of components of an associated demand,
calculating an updated optimization variable for each particle,
calculating an updated velocity of each particle within the solution space, and
upon completion of a maximum number of iterations, selecting the optimized maintenance schedule from the executed scheduling iterations, based on a highest-obtained value of the optimization variable during the iterations.

11. The method of claim 10, comprising:
calculating, for a current iteration of the scheduling iterations, a best particle position for a particle within the solution space, as compared to particle positions of preceding iterations for the particle, and judged using its corresponding optimization variable in the solution space.

12. The method of claim 11, comprising:
calculating, for a current iteration of the scheduling iterations, a global best particle position for all particles within the solution space, as compared to particle positions of preceding iterations for all particles and judged using optimization variables for all particles in the solution space.

13. The method of claim 12, comprising:
calculating the updated velocity of each particle, based on the best particle position and the global best particle position corresponding thereto.

14. The method of claim 10, wherein the optimization variable is calculated in terms of a production predicted to be achieved by a corresponding component in conjunction with a corresponding maintenance schedule, relative to a maintenance cost associated therewith.

15. The method of claim 10, comprising
defining the plurality of particles including encoding each position vector as a component subvector having a maximum number of dimensions based on a maximum number of maintenance occurrences within the maintenance time window, defined with respect to the initial maintenance interval.

16. The method of claim 15, comprising:
filtering a calculated maintenance occurrence of the component subvector that falls outside of the maintenance time window.

17. A system comprising:
at least one processor; and
a non-transitory computer-readable storage medium storing instructions that are executable by at the least one processor, the system further including
a maintenance schedule optimizer configured to cause the at least one processor to execute a particle swarm optimization in which each component of a plurality of components is associated with an initial maintenance interval between pairs of maintenance occurrences, and the maintenance schedule optimizer is further configured to cause the at least one processor to iteratively generate maintenance schedules for each component in which the initial maintenance interval is dynamically adjustable at each iteration between each pair of maintenance occurrences, the maintenance schedule optimizer including,
a particle handler configured to associate each component with a particle representing a corresponding maintenance schedule at each iteration, and in which a number of particle dimensions corresponds to a number of maintenance occurrences in the corresponding maintenance schedule, and
an update handler configured to update a current position and current velocity for each particle at each current iteration, based on a preceding position and preceding velocity thereof during a preceding iteration.

18. The system of claim 17, wherein the update handler is configured to calculate, for each current iteration, a best particle position for each particle, as compared to particle positions of preceding iterations for each corresponding particle, and judged using an optimization variable, the optimization variable calculated in terms of a production predicted to be achieved by a corresponding component in conjunction with a corresponding maintenance schedule, relative to a maintenance cost associated therewith.

19. The system of claim 18, wherein the update handler is configured to calculate, for each current iteration of the scheduling iterations, a global best particle position for all particles, as compared to particle positions of preceding iterations for all particles and judged using optimization variables for all particles.

20. The system of claim 19, comprising:
   calculating the updated velocity of each particle, based on the best particle position and the global best particle position corresponding thereto.

* * * * *